(No Model.)  3 Sheets—Sheet 2.
G. E. BURT.
PULVERIZER AND SPREADER.
No. 326,015.   Patented Sept. 8, 1885.
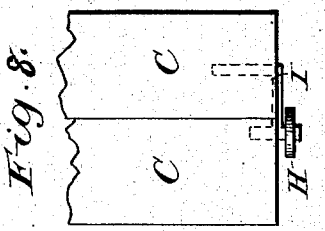
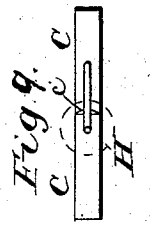
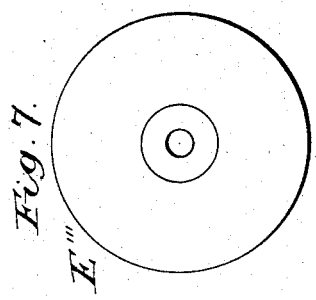
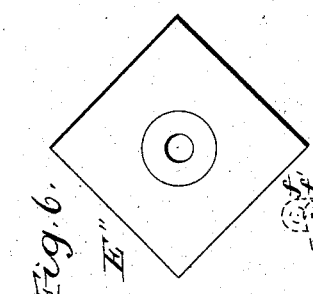
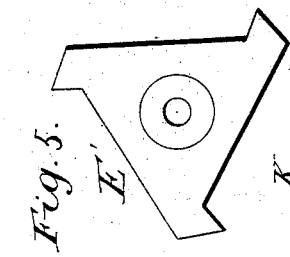
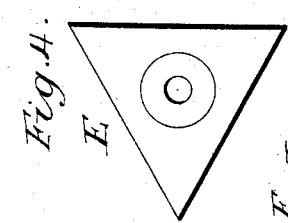
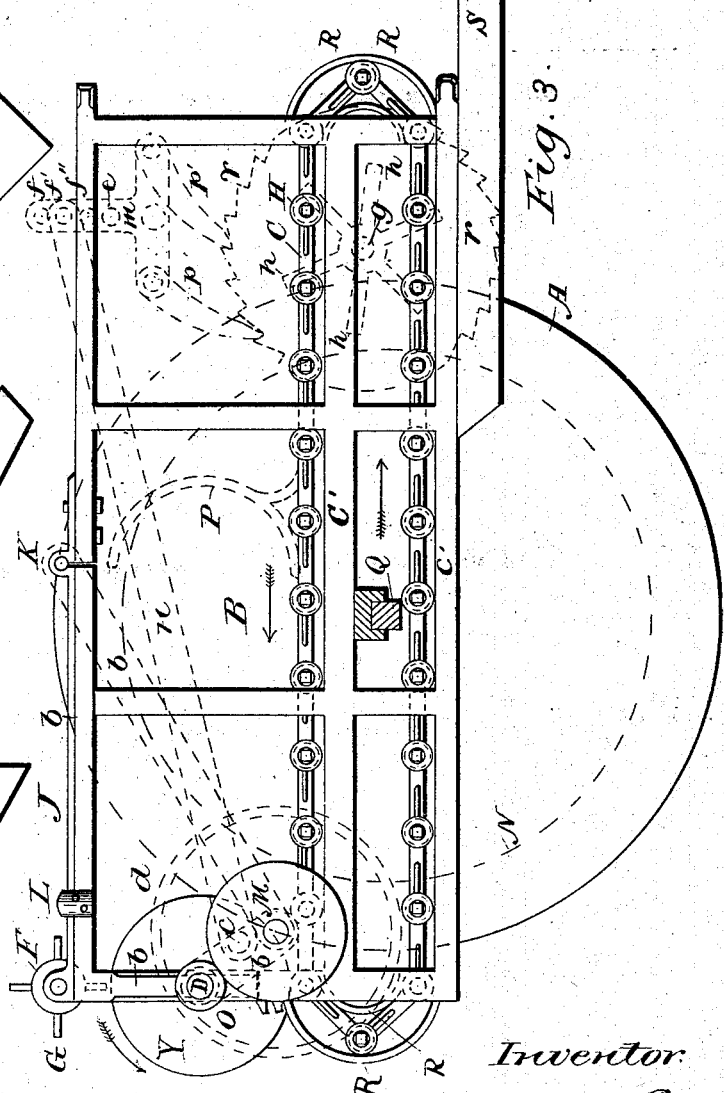
Witnesses:
H. A. Hildreth
E. E. Burt
Inventor:
George E. Burt.

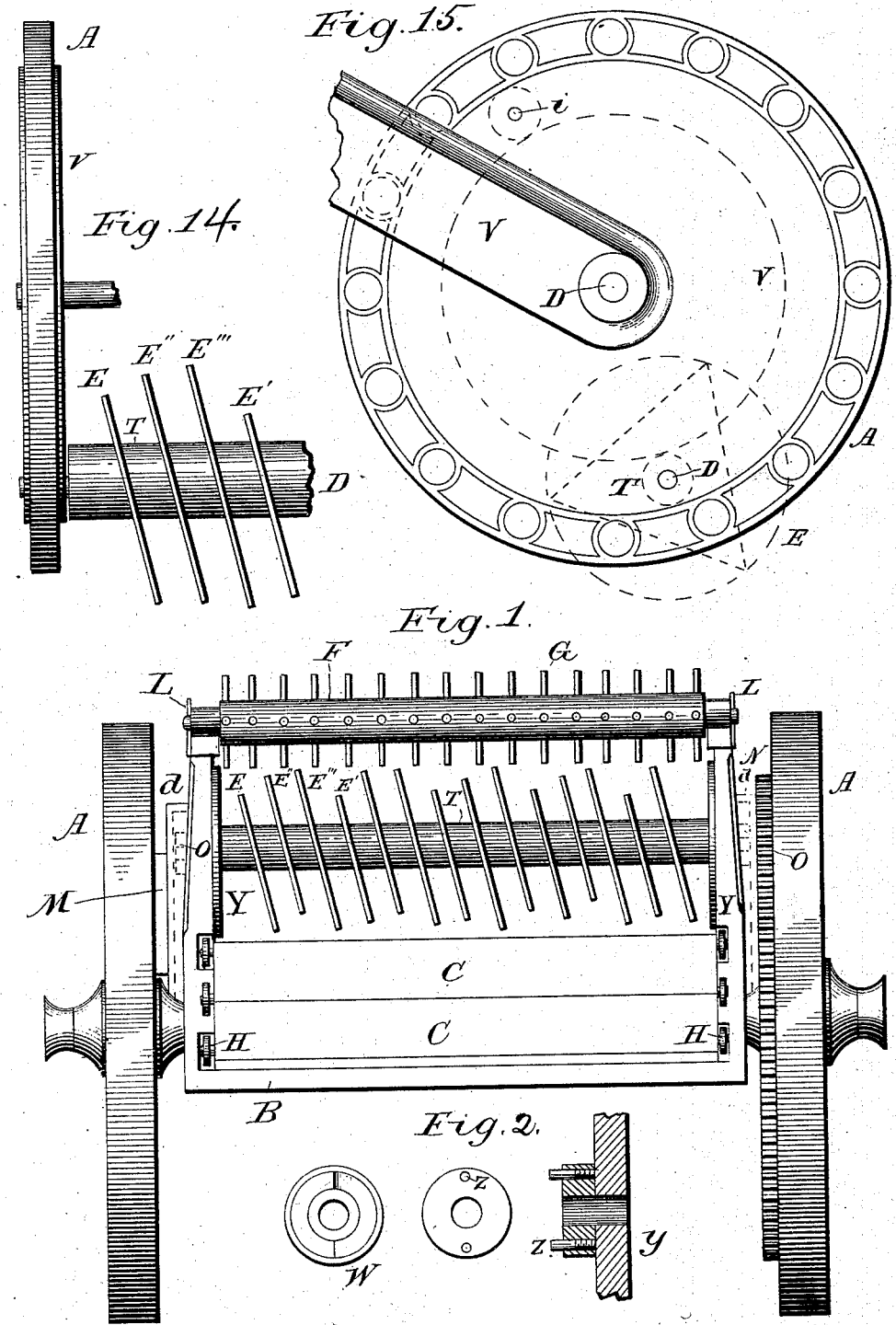

(No Model.) 3 Sheets—Sheet 3.
G. E. BURT.
PULVERIZER AND SPREADER.
No. 326,015. Patented Sept. 8, 1885.
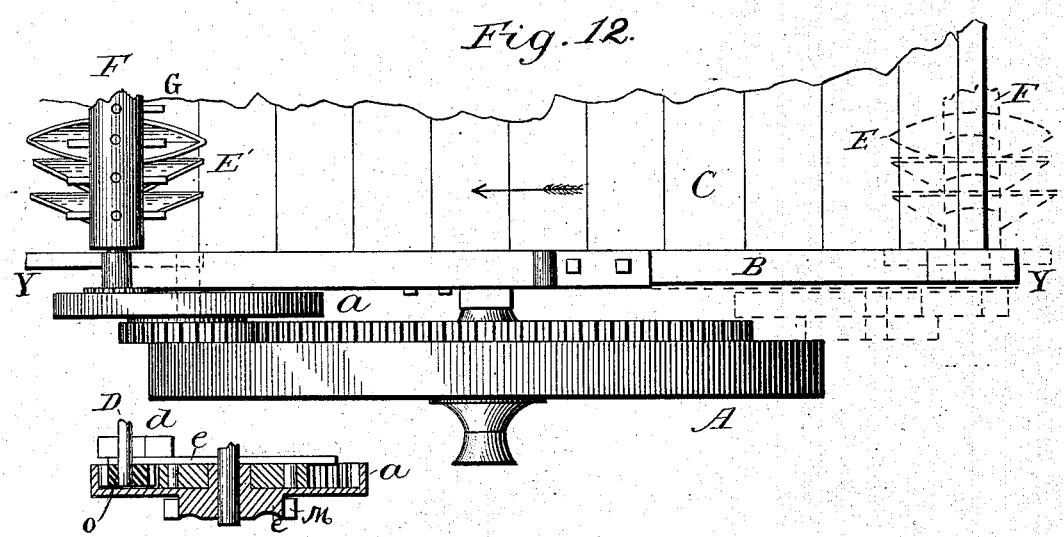
Fig. 12.
Fig. 13.
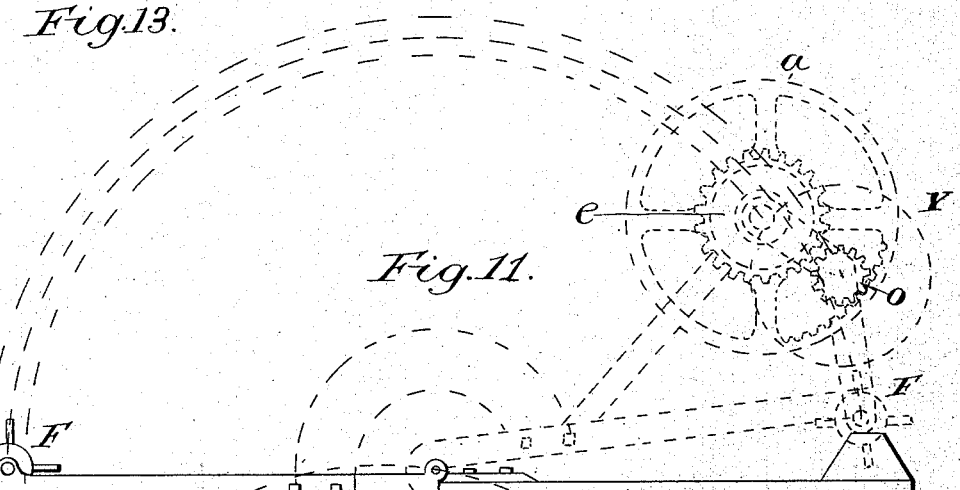
Fig. 11.
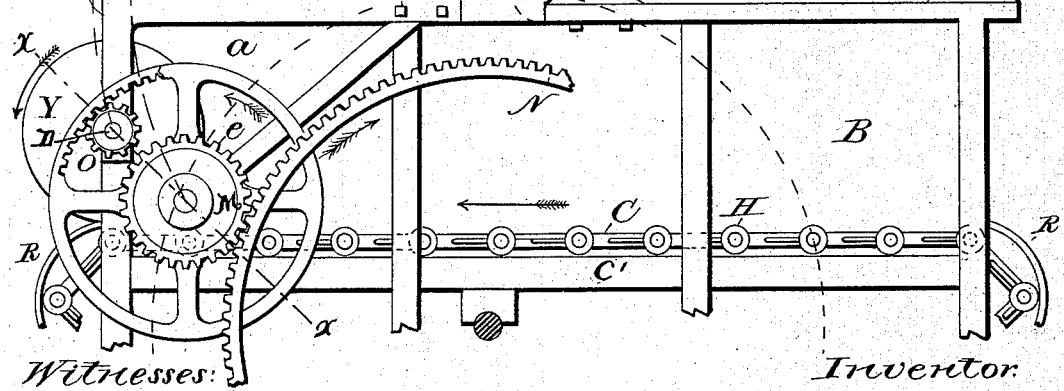
Witnesses:
H. A. Hildreth
E. E. Burt.
Inventor
George E. Burt,

United States Patent Office.

GEORGE E. BURT, OF HARVARD, MASSACHUSETTS.

PULVERIZER AND SPREADER.

SPECIFICATION forming part of Letters Patent No. 326,015, dated September 8, 1885.

Application filed October 4, 1884. (No model.)

*To all whom it may concern:*

Be it known that I, GEORGE E. BURT, a citizen of the United States, residing at Harvard, in the county of Worcester and State of Massachusetts, have invented an Improvement in a Machine for Pulverizing and Spreading Manure and other Fertilizers, of which the following is a specification.

My invention relates to machines which are designed for pulverizing and distributing upon the field manure and other fertilizers; and the nature of my invention consists in providing a cart-body which is mounted on transporting and driving wheels with a series of rotary pulverizers and distributers of peculiar construction, and also in providing for readily moving said pulverizers and distributers and driving-gear immediately connected therewith from the rear to the front of the cart-body for facilitating the loading of the latter, as will be fully understood from the following description, when taken in connection with the annexed drawings, in which—

Figure 1 is a rear end elevation of the improved machine. Fig. 2 shows views of the propelling pulverizer-ratchet that actuates the distributer. Fig. 3 is a view of one side of the machine with one transporting-wheel omitted and some of the gear-wheels indicated by dotted lines. Figs. 4, 5, 6, and 7 are views of the different distributing and disintegrating plates. Fig. 8 is a top view of the ends of two sections of the endless movable bottom of the cart. Fig. 9 is an end view of Fig. 8. Fig. 10 is an end view showing the two sections flexed at an angle. Fig. 11 is a side elevation of the machine with several of the parts broken away, indicated by dotted lines. Fig. 12 is a top view of one side of the machine, the opposite side being broken away. Fig. 13 is a sectional view on the line X X of Fig. 11. Fig. 14 is a rear view of one of the supporting-wheels and a severed portion of the soil-pulverizer. Fig. 15 is an end view of the soil-pulverizer.

The transporting-wheels A, the draft-pole S', and axle Q are constructed in the usual well-known manner, and upon the axle is suitably mounted the wagon-body B, which is provided with an endless bottom movable in the direction of the arrows on Figs. 3, 11, and 12. This bottom is composed of horizontal transverse sections C, which are connected together by pivots I, constructed with projections that form angles which are inserted in the ends of the sections C, so as to flexibly connect them together and to afford axles for truck-wheels H. It will be observed by reference to Figs. 9 and 10 that the joints of the sections are so arranged and that the edges $c'$ of a section are grooved out in such manner that self-clearing joints are formed which will not be clogged by the fertilizer. This endless bottom is sustained and guided by truckways C' and semicircular end guides, R R. (Shown in Fig. 3.)

The propelling-wheel $h$ is composed of radial arms (indicated by dotted lines, Fig. 3) which suitably engage with the upper and lower sections, C, of this endless bottom, and these propelling-wheels are keyed on a transverse horizontal shaft, $g$, on which latter a ratchet-wheel, $r$, is also keyed. With this wheel $r$ two pawls, $p$ $p'$, engage, which pawls are pivoted to the lower arms of a ratchet, $m$, having its fulcrum at $e$ in the side of the wagon-body B.

To the vertical arm of the rocker $m$, at either one of the points $f f' f^2$, is pivoted one end of a connecting-rod, $n$, the opposite end of which is pivoted to a wrist-pin fixed eccentrically in the face of a wheel, M, and is held in position by means of a frame, $b$, which is hinged on top of the wagon-sides at K.

F designates a beater, which is composed of a horizontal transverse shaft and radial teeth G, and which has its end bearings in the ends of arms J, held in place by guides L and pivots K.

N is the main propelling-gear, which is secured concentrically to the wheel A and engages with the teeth of wheel M. This wheel M is keyed on the shaft of an inside gear-wheel, $a$, which engages with a pinion spur-wheel, O, on the shaft D.

On the shaft D are applied the circular heads V V, on one of which is a hub provided with spring-actuated pins Z Z, adapted to engage with face-ratchets on pinion W on shaft D. By these means, when the machine is moved forward, the shaft D will be rotated in the direction indicated by the arrows on Figs. 3 and 11, and when the machine is backed the shaft D will not be rotated.

The distributer and pulverizer is composed of blades or plates E of triangular form, blades E', having angular teeth, quadrangular or square blades E², and circular blades E³, all of which are arranged in gangs and held on the shaft D between spacing-blocks T, with their faces in planes parallel to each other and oblique to the longitudinal axis of the shaft D. The blades and spacing-blocks are all confined tightly on the shaft D by means of nuts on the ends of the latter, (indicated by dotted lines, Fig. 1.)

When the operator desires to load the wagon with manure or other fertilizer, he disconnects the front end of the connecting-rod $n$ from the rocker-arm $m$ and swings the entire mechanism of the pulverizing-distributer in the arc of a circle described by dotted lines on Fig. 11, and supports the same upon blocks J' at the front end of the wagon-body. The rear end of the body B is thus cleared of all obstructions and the wagon can be conveniently loaded. After loading, the gearing and distributer are turned back to engage with the wheel N; and when it is desired to operate the distributer the connecting rod $n$ is attached to the arm of the rocker $m$ at any one of the points $f f' f^2$, according to the speed it is desired to give the endless bottom C.

If at any time it is desired to stop the feed of the fertilizer, this can be done by simply disconnecting the connecting-rod $n$ from the rocker $m$.

It is obvious that by using two pawls, $p p'$, as shown and described, a continuous rotary motion or feed can be given to the endless bottom, the speed of which can be regulated by adjusting the front end of the connecting-rod $n$ nearer to or farther from the axis $e$, about which the rocker vibrates.

It will be observed that by reason of the oblique arrangement of the blades they will stir and disintegrate the fertilizer and at the same time aid in evenly distributing it upon the ground. The combination of the circular blades E³ with the angular blades, as described, will in the case of distributing manure hold the same back and prevent a too free distribution, and at the same time prevent the straw in the manure from being wound upon the distributer.

Having described my invention, what I claim as new is—

1. In a fertilizer distributer and pulverizer, the combination, with a wagon-body having an endless movable bottom, of a rotary pulverizer and distributer composed of blades of different diameters and angles properly placed and arranged obliquely on a shaft, substantially as described.

2. In a fertilizer distributer and pulverizer, the combination, with a wagon-body having an endless feed bottom, of the gears N M $a$ O, the connecting-rod, $n$, rocker $m$, its pawls, a ratchet-wheel, $r$, and propeller-arms $h$, substantially as and for the purposes described.

3. The combination, with a wagon-body provided with an endless feed bottom and a rotary fertilizer pulverizer and distributer, of the gears N M $a$ O, the connecting-rod pivoted eccentrically to wheel M and detachably connected to an arm of the rocker $m$, the pawls $p p'$, the ratchet-wheel, and the propeller-arms $h$ on the shaft of said ratchet-wheel, substantially as described.

4. The endless feed bottom composed of sections C, jointed together by means of angular pieces I, bearing wheels H, one edge of each section C being grooved, for the purpose described.

5. For a fertilizer distributer and pulverizer, a shaft, D, having oblique angular and circular blades and intermediate spacing-blocks secured upon the shaft, substantially as described.

6. The combination of a movable bottom constructed of sections, pivoted with angle-pivots, arranged to make self-clearing joints, with pulverizer and distributer constructed and arranged with angular zigzag plates, substantially as described.

GEORGE E. BURT.

Witnesses:
 H. A. HILDRETH,
 E. E. BURT.